United States Patent Office 3,547,829
Patented Dec. 15, 1970

3,547,829
PREPARATION OF OLEFIN POLYMERIZATION CATALYST
Bayard T. Lamborn, Matawan, N.J., assignor to Hercules Incorporated, Wilmington, Del., a corporation of Delaware
No Drawing. Filed Dec. 27, 1968, Ser. No. 787,569
Int. Cl. B01f *13/00*
U.S. Cl. 252—429      4 Claims

ABSTRACT OF THE DISCLOSURE

Titanium trichloride catalysts of reduced particle size are made by introducing vapors of titanium tetrachloride into a solution of an organoaluminum compound in an inert liquid diluent.

---

This invention relates to an improved process for preparing trivalent titanium catalysts for use in the polymerization and copolymerization of ethylene and higher 1-olefins.

Polymers and copolymers of 1-olefins have achieved additional prominence in recent years since the discovery of the so-called transition metal catalysts, which make possible the production of such polymers having very desirable properties at relatively mild conditions of temperature and pressure. Of particular interest are the highly crystalline polymers of ethylene and propylene which have become known as high density polyethylene and stereoregular, or isotactic or stereosymmetric, polypropylene and also the highly crystalline copolymers, e.g., block copolymers, that are formed by polymerizing ethylene and propylene with each other or with a small amount of another 1-olefin.

Such polymers and copolymers, as normally made by the use of a transition metal catalyst, are recovered in the form of small particles ranging in size from about 75 to 800 microns in their largest dimension. More recently, the art has found a need for polymers of smaller particle size for use as flatting agents in paints, or for use in organosol coating, electrostatic spraying, and related applications. These smaller sized particles are commonly obtained by grinding the larger particles obtained from the polymerization. Grinding of the polymers is, however, a very difficult and expensive procedure as the polymers as normally produced are not very friable, and the reproducibility of grinding is very poor.

The generic term "transition metal catalysts" is used in the polyolefin art to refer to a class of catalyst compositions comprising transition metal compounds in a reduced valence state in combination with an activator which is usually an alkylaluminum compound. The transition metal compounds most widely used are compounds of trivalent titanium. The preferred trivalent titanium compound is "titanium trichloride," a term which is used generically in the art as it is applied not only to pure titanium trichloride but also to compositions in which titanium trichloride is co-crystallized with an aluminum compound such as aluminum trichloride. For example, a material sold commercially and referred to as titanium trichloride and made by reduction of $TiCl_4$ with metallic aluminum is actually co-crystallized $3TiCl_3 \cdot AlCl_3$ having the empirical formula $AlTi_3Cl_{12}$. Other compounds referred to as titanium trichloride can be prepared by reducing $TiCl_4$ with hydrogen, metallic titanium, or titanium monoxide. Another method of making titanium trichloride comprises reducing $TiCl_4$ with an organoaluminum compound such as a trialkylaluminum or an alkylaluminum halide. Here again, the product of such reduction is not pure $TiCl_3$, but titanium trichloride co-crystallized with other materials such as with $AlCl_3$ or with $AlCl_3$ and an organoaluminum halide. See, for instance, U.S. Pats. 3,058,963 and 3,108,973 to E. J. Vandenberg and U.S. Pat. 3,128,252 to Tornqvist et al.

The particle size of a polyolefin produced by the use of a titanium trichloride catalyst is generally proportional to the particle size of the catalyst. The commercial titanium trichloride catalysts have particle sizes ranging from 10 to 75 microns in the largest dimension and, as above mentioned, produce polymers having a particle size ranging from about 100 to 800 microns in the average dimension.

It is an object of the present invention to provide a process for making titanium trichloride catalyst of controlled small particle size.

The process of the invention is an improvement on the process disclosed in U.S. Pat. 3,058,963 wherein a titanium trichloride catalyst is prepared by reacting titanium trichloride and an organoaluminum compound in an inert liquid medium. The improvement of the present invention comprises introducing vapors of titanium tetrachloride into a solution of an organoaluminum compound in an inert liquid diluent, thereby producing an insoluble precipitate of titanium trichloride catalyst. This improvement, i.e., the use of $TiCl_4$ in gaseous form, results in a titanium trichloride catalyst of smaller than normal particle size, and further affords the advantage of making it possible to control the size of the particle by varying the concentration of the organoaluminum compound in the solution and by varying the rate of introduction of $TiCl_4$ vapors.

The process of the invention is conducted quite simply by introducing vapors of $TiCl_4$, with or without an inert carrier gas, into an inert liquid diluent containing dissolved organoaluminum compound at a temperature ranging from about $-10$ to $50°$ C.

The organoaluminum compounds employable in the invention to reduce the $TiCl_4$ include all of those recognized in the prior art as suitable for reducing $TiCl_4$ to a catalytically active titanium trichloride catalyst. Thus, for example, the organoaluminum compound can be a trialkylaluminum such as triethyl-, tripropyl- or triisobutylaluminum or it may be a di- or monoalkylaluminum halide such as diethylaluminum chloride, diethylaluminum bromide or ethylaluminum dichloride; or it may be an alkylaluminum hydride such as diethylaluminum hydride, ethylaluminum dihydride or diisobutylaluminum hydride. The organoaluminum compound can also be a polymeric compound such as described in U.S. Pat. 3,149,136 which specifically relates to the compound formed by the reaction of isoprene with an aluminumtrialkyl.

In the preferred method of conducting the process of the invention the organoaluminum compound is dissolved in the inert liquid diluent at the start of the reaction. However, the organoaluminum compound can also be added in a continuous or incremental manner as the vapors of $TiCl_4$ are introduced into the diluent.

Any of the inert liquid diluents known to the prior art can be used as a medium in the process of the invention. Preferred diluents are aliphatic hydrocarbons such as hexane, heptane and higher paraffinic fractions; cycloaliphatic hydrocarbons such as cyclohexane; and aromatic hydrocarbons such as benzene, toluene and xylene. In addition halogenated hydrocarbons such as chlorobenzene, chloronaphthalene and the like can be employed as the diluent. If the diluent has a low boiling point, the process can conveniently be operated under whatever pressure is necessary to maintain the diluent in the liquid phase.

Desirably, the concentration of organoaluminum compound in the liquid diluent will range from about 25 to 1% by weight. It has been established, as later examples will show, that the particle size of the precipitated titanium trichloride catalyst will vary with the concentration of the organoaluminum compound in the diluent; the lower the concentration, the smaller the particle size of the precipitate. It has also been established that the rate of addition of the gaseous $TiCl_4$ also influences particle size of the precipitate; the greater the rate of addition, the smaller the particle size of the precipitate. While the rate of $TiCl_4$ addition is quite variable, it is desirable that the $TiCl_4$ be added at the rate of from about 0.05 to 1.50 ml. per liter of diluent per minute. The temperature at which the reaction is carried out is insignificant as far as the particle size of the precipitate is concerned, but does have an effect on the activity of the precipitate as a catalyst in various polymerization reactions. For example, if it is desired to produce a catalyst suitable for the polymerization of propylene to a highly crystalline polymer, it is desirable that the reaction be carried out at a relatively low temperature, say, not exceeding 10° C., and later heat treated. On the other hand, if the objective is to prepare a catalyst for the polymerization of ethylene, higher temperatures within the above defined range can be employed without loss of activity.

The following examples are presented for purposes of illustration and not by way of limitation. Unless otherwise specified, rates of addition of $TiCl_4$ are on the basis of liquid measurement.

EXAMPLE 1

Into a reaction vessel equipped with a magnetic stirrer there was placed 100 ml. of a 25% by weight solution of ethylaluminum sesquichloride (an equimolar mixture of diethylaluminum chloride and ethylaluminum dichloride) in a liquid paraffinic hydrocarbon fraction having a boiling range of 170–200° C.

$TiCl_4$ vapors were generated in a separate vessel by passing nitrogen gas through liquid $TiCl_4$ heated to a temperature of about 90° C. The resultant stream of nitrogen containing $TiCl_4$ vapors was introduced into the bottom of the first reaction vessel while maintaining the contents at a temperature of 27° C. at such a rate that 0.05 ml. of $TiCl_4$ was introduced per minute. The reaction was continued for 4½ hours during which a finely divided rapid settling precipitate of titanium trichloride formed. This precipitate was separated by filtration and washed free from its mother liquor with fresh diluent.

EXAMPLE 2

The general procedure of Example 1 was followed except that (a) an additional 75 ml. of diluent was added to the reaction vessel to dilute the concentration of ethylaluminum sesquichloride to 14.7% by weight; (b) the rate of $TiCl_4$ introduced was 0.04 ml. per minute; and (c) the time of reaction was 5½ hours.

At the end of the reaction, the reaction mixture was transferred to a different vessel where it was heated 4 hours at 105° C. The titanium trichloride precipitate was then separated and washed free from mother liquor with fresh diluent.

EXAMPLE 3

The procedure was the same as in Example 1 except that (a) 500 ml. of diluent was added to reduce the ethylaluminum sesquichloride concentration to 5.5% by weight; (b) the rate of $TiCl_4$ addition was 0.01 ml. per minute; and (c) the reaction temperature was 0° C. and the reaction time 3 hours. At the completion of the reaction the mixture was heated 4 hours at 100° C. while continuing stirring. The precipitate was then separated and washed free from its mother liquor with fresh diluent.

EXAMPLE 4

Into a reaction vessel containing a magnetic stirrer there was introduced 200 ml. of a 25% by weight solution of ethylaluminum sesquichloride in the diluent employed in Example 1. $TiCl_4$ vapors were introduced in a nitrogen stream at the rate of 0.25 ml. of $TiCl_4$ per minute over a period of 110 minutes while maintaining the temperature of the reaction at 0° C. Thereafter, the reaction mixture was heated 4 hours at 95–100° C. while continuing stirring. The precipitate that formed was separated and washed free from its mother liquor with fresh diluent.

The data from Examples 1 to 4, including particle size of the titanium trichloride precipitate, are as follows:

| Example: | Rate $TiCl_4$ addition, ml./min. | Sequi concentration, percent | Aprrox. $TiCl_3$ particle size, microns |
|---|---|---|---|
| 1 | .05 | 25.0 | 8 |
| 2 | .04 | 14.7 | 5 |
| 3 | .11 | 5.5 | 1–2 |
| 4 | .25 | 25.0 | 1–2 |

The data show (Examples 1 to 3) that the particle size is directly proportional to the concentration of the ethylaluminum sesquichloride and (Examples 1 and 4) that the particle size is also related to the rate at which the $TiCl_4$ is added.

EXAMPLE 5

Into a reaction vessel containing a magnetic stirrer there was introduced 500 ml. of inert hydrocarbon diluent in a nitrogen atmosphere. $TiCl_4$ vapors were introduced in a nitrogen stream co-currently with the introduction of a solution of 25 weight percent ethylaluminum sesquichloride in the same inert hydrocarbon diluent. The addition rate for the $TiCl_4$ was about 0.45 ml./min. and for the ethylaluminum sesquichloride about 3.33 ml./min. The reaction mixture was maintained at a temperature of 0° C. during the addition and for a period of 4 hours after the addition was completed. Thereafter, the reaction mixture was heated to 95–100° C. and maintained at that temperature for 4 hours with agitation. The precipitate formed was washed free from its mother liquor with fresh inert diluent.

The particle size of the precipitate obtained was from 0.5 to 5 microns.

EXAMPLE 6

Into a reaction vessel containing a magnetic stirrer there was introduced 1000 ml. of inert diluent under a nitrogen atmosphere and 70.5 ml. of 18 weight percent diethylaluminum chloride solution in the same diluent. The mixture was cooled to 0° C. and 15.1 ml. of $TiCl_4$ was added at 90° C. in a stream of nitrogen regulated to give a $TiCl_4$ rate of about 0.58 ml./min. The reaction mixture was maintained at a temperature of 0° C. during the addition and for a period of 4 hours after the addition was completed. Thereafter the reaction mixture was heated to 95–100° C. and maintained at that temperature for 4 hours with agitation. The precipitate formed was washed free from its mother liquor with fresh inert diluent.

The particle size of the precipitate was from 0.5 to 5 microns.

POLYMERIZATION EXAMPLES

The titanium trichloride catalysts of Examples 1–6 were used for the polymerization of propylene using diethylaluminum chloride as activator. The polymerizations were carried out by preparing a dispersion of catalyst in the above-defined diluent at a concentration of 10 millimoles titanium per liter together with 20 millimoles diethylaluminum chloride per liter. Gaseous propylene was introduced to the catalyst dispersion at the rate of 28 g./liter per hour over a period of 5 hours while maintaining the temperature at 50° C. The reaction was terminated by the addition of 10 ml. of n-butanol and the crystalline polypropylene which had formed as a precipitate was recovered by decanting the diluent, washing the diluent-wet polymer with water, steam distilling to remove the remainder of diluent, and then drying the polymer. The following table shows the particle sizes of the polypropylene obtained with the catalyst.

| Catalyst example No.: | Polymer size, microns |
|---|---|
| 1 | 40–70 |
| 2 | About 50 |
| 3 | 15–20 |
| 4 | 15–20 |
| 5 | 4–15 |
| 6 | 4–15 |

Similarly, the catalyst of Example 4 was used to polymerize ethylene using ethylaluminum sesquichloride as the activator. In this case the polyethylene was obtained in the form of friable agglomerates which were easily crushed to a powder having an average primary particle size of 15–20 microns.

EXAMPLE A

For purposes of comparison with the prior art, the catalyst was prepared according to the procedure of Example 3 except that the $TiCl_4$ was introduced to the reaction in liquid form. In this instance the titanium trichloride catalyst obtained had a particle size of about 35 microns, and when used to polymerize propylene resulted in a polymer having a particle size of about 350 microns. Thus, the beneficial effect of introducing $TiCl_4$ in vaporized form is evident.

What I claim and desire to protect by Letters Patent is:

1. In the process for the manufacture of a titanium trichloride catalyst useful for the polymerization of olefins wherein titanium tetrachloride is reacted with an organoaluminum compound in an inert liquid diluent, the improvement which comprises introducing vapors of titanium tetrachloride into an inert liquid diluent containing dissolved organoaluminum compound at a temperature ranging from about −10 to 50° C.

2. The process of claim 1 in which the organoaluminum compound is an alkylaluminum halide.

3. The process of claim 1 in which the concentration of organoaluminum compound in the diluent ranges from about 1 to 25% by weight.

4. The process of claim 1 in which the titanium tetrachloride is introduced at the rate of 1.50 to 0.05 ml. per liter of diluent per minute.

References Cited
UNITED STATES PATENTS

| | | | |
|---|---|---|---|
| 3,398,076 | 6/1968 | Lamborn | 252—429 |
| 3,179,604 | 4/1965 | Ingberman | 252—429 |
| 2,939,846 | 6/1960 | Gordon | 252—431 |

DANIEL E. WYMAN, Primary Examiner

P. M. FRENCH, Assistant Examiner